March 21, 1944.  E. W. AUSTIN  2,344,584
IMPLEMENT FOR TRACTORS
Filed May 10, 1941  3 Sheets-Sheet 1

INVENTOR
*Ellsworth W. Austin*
BY
*Marcus J. Lothrop*

March 21, 1944.                E. W. AUSTIN                2,344,584
                         IMPLEMENT FOR TRACTORS
                          Filed May 10, 1941           3 Sheets-Sheet 3

INVENTOR
Ellsworth W. Austin
BY
Marcus Lothrop

Patented Mar. 21, 1944

2,344,584

UNITED STATES PATENT OFFICE 2,344,584

IMPLEMENT FOR TRACTORS

Ellsworth W. Austin, Cedar Rapids, Iowa, assignor to La Plant-Choate Mfg. Co., Inc., Cedar Rapids, Iowa, a corporation of Delaware Application May 10, 1941, Serial No. 392,875

5 Claims. (Cl. 37—144)

My invention relates primarily to tools which are adapted to be mounted upon and propelled by a tractor, especially tools in the nature of bulldozers and trailbuilders which customarily are supported upon the tractor in the front thereof for a pushing operation, usually upon earth, and are raised and lowered into various positions with respect to the tractor.

It is customary for a tractor manufacturer to furnish a tractor without implements and for a separate manufacturer or source to provide implements which are to be attached to the tractor in the field. The usual practice is to attach a bulldozer or trailbuilder to a track laying tractor by means of a U frame which extends around the front end and along the sides of the tractor, being pivotally mounted on the tractor track frames and being connected by operating mechanism to some part of the tractor, sometimes the main body or frame thereof, and sometimes the track frames themselves.

It is an object of my invention to provide an implement for a tractor which is an improvement over those heretofore known.

Another object of my invention is to provide an implement for a tractor which can readily be installed thereupon.

Another object of my invention is to provide an implement for a tractor in which the over-all width is less than usual.

Another object of my invention is to provide an implement for a tractor in which the operating stresses are taken by the structure in an improved fashion.

Another object of my invention is to provide an implement for a tractor in which the weight is reduced from usual practice.

Another object of my invention is to provide an implement for a tractor which is very effective in operation.

The foregoing and other objects are attained in the embodiment of the invention illustrated in the drawings, in which Fig. 1 is a side elevation of a tractor provided with the implement of my invention.

Figure 1:
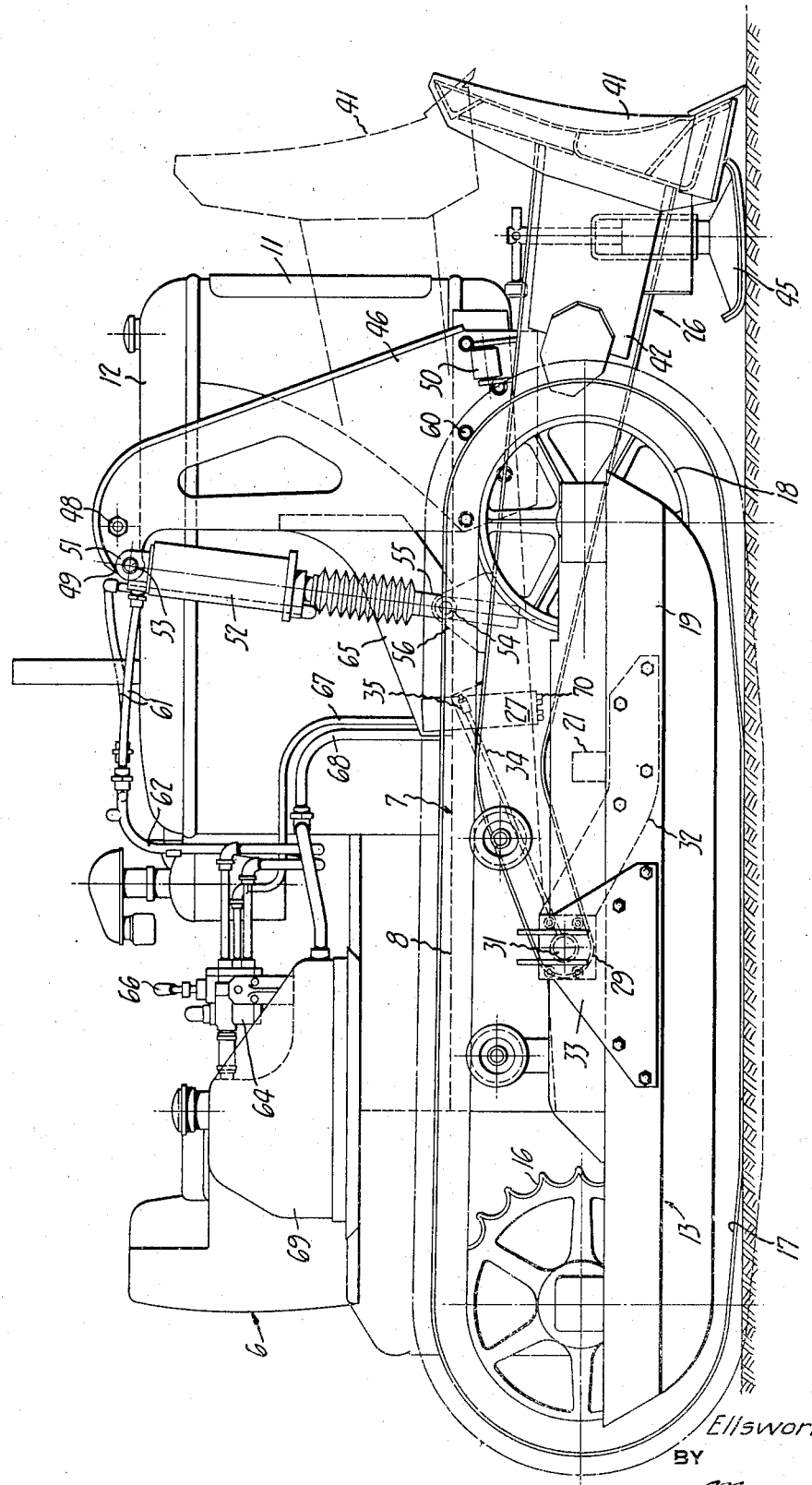

In its preferred form, the implement for a tractor of my invention is designed to be applied to a tractor which has a central main frame on either side of which is disposed a side frame laterally spaced away from the main frame. Within the respective spaces are disposed side beams attached to the tractor for vertical swinging movement, and at their forward ends secured to a transverse tool such as a bulldozer blade. Brackets are mounted at either side of the main frame adjacent the lateral spaces and operating means such as expansible hydraulic mechanisms are disposed above the side beams and in the spaces, being connected to the side beams and to the brackets. When the hydraulic mechanisms are operated the tool, such as a bulldozer, is raised and lowered.

While the tractor implement of my invention can readily be applied to almost any usual or commercial type of tractor, it is illustrated herein in connection with a track laying tractor generally designated 6. This tractor includes a main frame 7, which designation is intended to apply to the entire central portion of the vehicle, usually incorporating a propulsion engine, transmission and clutching mechanism as well as final drive gearing and the like, all of which are quite standard. Included in the main frame are frame side rails 8 and 9, respectively, which extend substantially in a horizontal plane longitudinally of the tractor, and adjacent their forward ends are utilized to support a radiator 11 which is the foremost portion of the tractor and stands upwardly from the frame a substantial distance. A hood 12 extends over and covers the radiator and the engine.

At either side of the main frame 7 there are disposed side frames 13 and 14 respectively, which designation is intended to include not only a driving sprocket 16 connected to the mechanism in the main frame 7, but likewise to include a ground-engaging track 17, trained around the sprocket and an idler 18 related through side members 19. The arrangement is such that the side frames 13 and 14 are pivotally attached to the main frame 7 for oscillation in vertical planes about the axis of the drive sprockets 16. A transverse equalizer spring 21 supports the forward portion of the main frame 7 upon the side frames 13 and 14 respectively.

With regard to the lateral boundaries of the main frame 7, the side frames 13 and 14 are spaced therefrom to provide intervening spaces 22 and 23 respectively. The spaces 22 and 23 can be considered to be laterally bounded by vertical planes containing the side structures of the main frame 7 and the adjacent side structures of the side frames 13 and 14.

In accordance with my invention, I have preferably utilized the spaces 22 and 23 as locations for part of the tractor implement. The implement includes a push frame generally designated 26, which is roughly U shaped in plan, and which includes a pair of similar side beams 27 and 28 respectively, each of which is preferably fabricated of plates and structural shapes to have a box-like cross-section. Each beam terminates at its rear end in a boss 29 encompassing a pivot pin 31.

Figure 2:
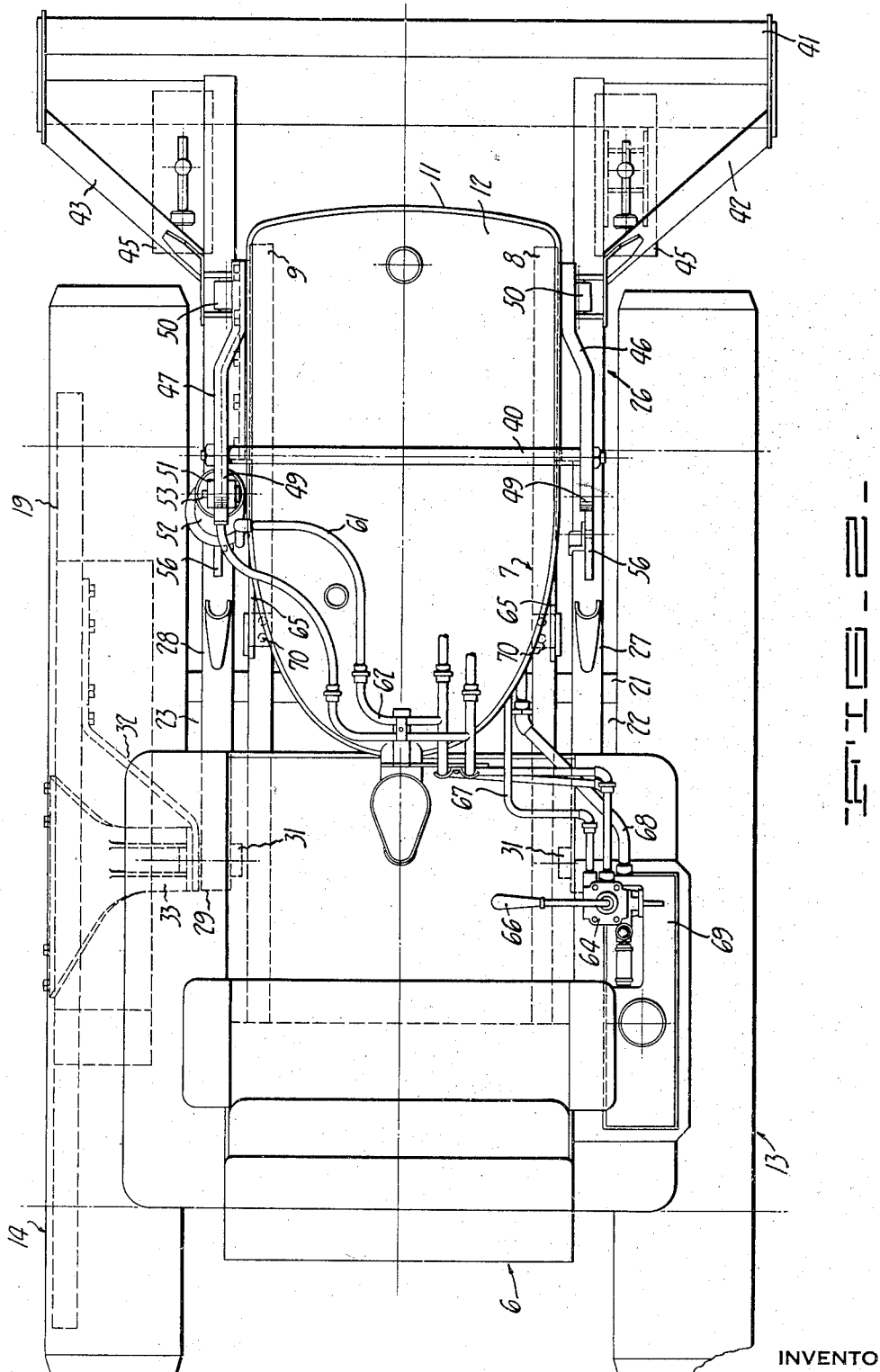
Fig. 2 is a plan of the structure shown in Fig. 1, certain symmetrical portions being broken away to increase the clarity of disclosure.

In the modification shown in Figs. 1 and 2, the pivot pins 31 are anchored in a pair of brackets 32 and 33 respectively, each of which is secured to the side frame 13 or 14 adjacent thereto and more particularly by a straddle mounting to opposite sides of the members 19. Thus, the pins 31 are fast on and partake of the swinging movement of the side frames 13 and 14, but since the pins 31 are not far from the axis of oscillation coincident with the axis of rotation of the rear sprocket 16, there is not a great deal of arcuate movement of the pins 31, although some does exist. Insofar as this arcuate movement does tend to introduce twisting, the push frame itself is twisted or looseness between the bosses 29 and the pins 31 relieves the strain. Because of the importance of the bearing on the pins 31, lubrication is facilitated by a grease tube 34 extending to a readily accessible grease fitting 35 protected by a shroud.

Figure 3:
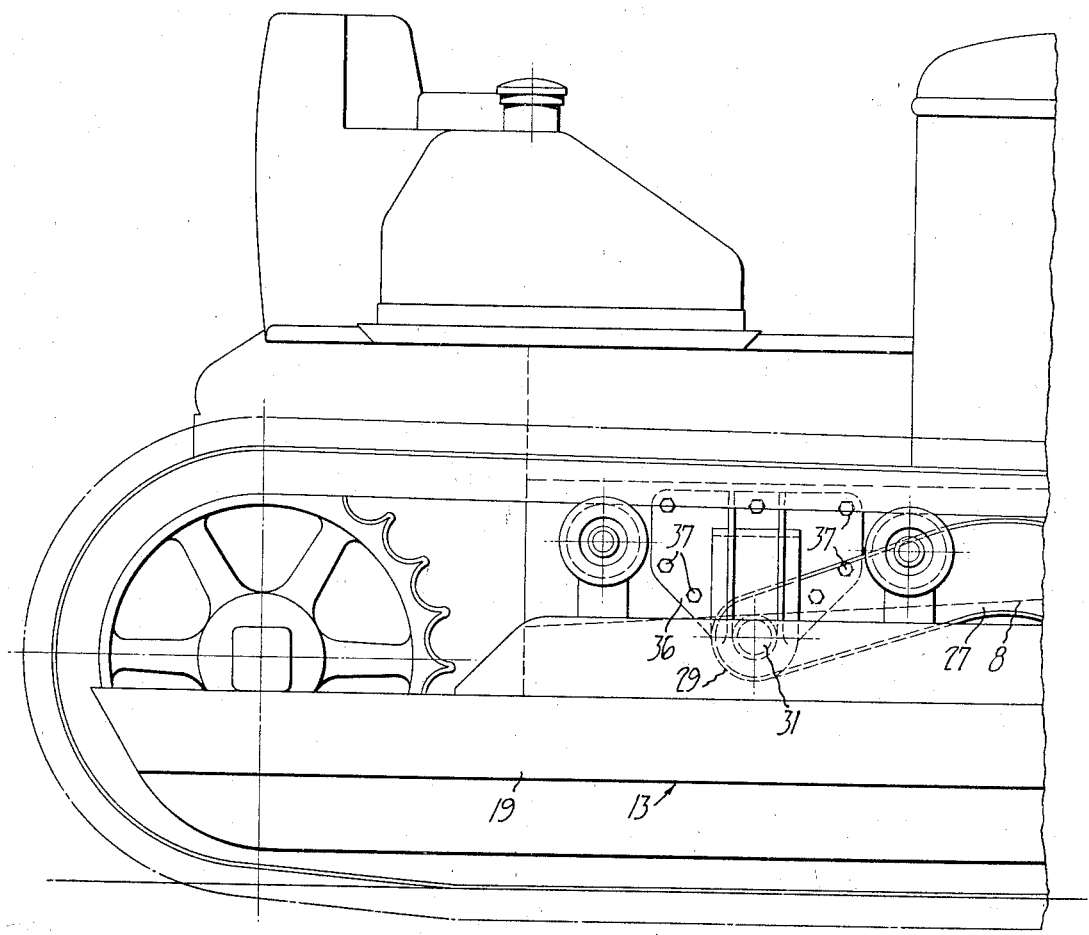
Fig. 3 is a partial side elevation of a modified form of structure generally similar to that shown in Fig. 1.
Figure 4:
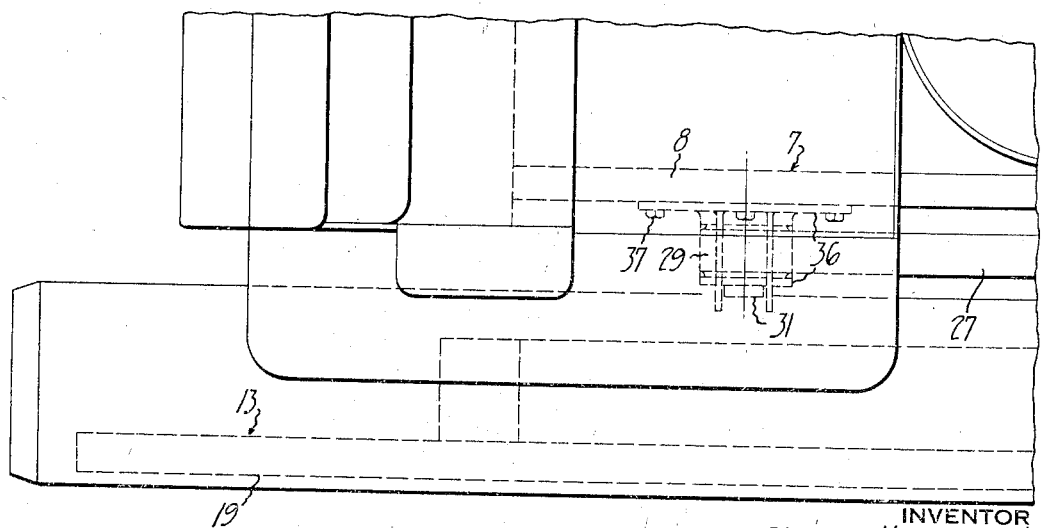
Fig. 4 is a plan of the modified structure of Fig. 3.

In the form of mounting shown in Figs. 3 and 4, the pins 31 are not connected to or mounted on the side frames 13 and 14 at all, although they carry the bosses 29 in exactly the same normal position as before described. The pins 31 in this instance are mounted in straddle brackets 36 each of which is fastened by bolts 37 to the main frame 7 and more particularly to the adjacent side member 8 or 9 thereof. In this latter modification, the pins 31 partake of the motion of the main frame 7 and not of the motion of the side frames 13 and 14. Hence, in this latter form, deviations or oscillations of the side frames are not effective upon the pins 31 and no transverse or lateral twisting of the U frame is introduced by this mounting and extra looseness in the bearings between the pins 31 and the bosses 29 is not necessary.

With either alternative mounting of the pins 31, however, the side beams 27 and 28 extend forwardly from the pins and are swept upwardly over the equalizer spring 21 and then extend more or less horizontally and parallel to each other, always within the spaces 22 and 23, until they terminate forwardly of the main frame 7 and ahead of the radiator 11. At the forward ends of the side beams they are secured to a transverse bulldozer blade 41, which is included in the U shaped push frame, and constitutes a tool for earth-working or the like. Other tools such as trailbuilder blades, rakes and the like can be substituted for the bulldozer blade 41, as is well known in the art. The bulldozer blade 41 is of customary construction and cross-section and in the present instance is securely united to the side beams 27 and 28. The width of the bulldozer blade 41, however, is made but slightly greater than the over-all width of the tractor, that is, the width of the tractor measured over both of the side frames 13 and 14.

In many localities there are laws limiting the maximum width of vehicles which can be transported over the roads. For example, many States limit the width to eight feet. In one commercial adaptation therefore, the width of the bulldozer blade 41 is made a fraction of an inch less than eight feet and the over-all width of the tractor is about one inch less than eight feet. With this relationship the vehicle can be transported over the road, yet the bulldozer blade is wide enough to clear a path for the following tractor, which itself has maximum width for lateral stability and traction. This arrangement precludes any structure extending outwardly from the side frames 13 and 14 beyond the maximum permissible width, and for that reason the side beams 27 and 28 are located not outside of the side frames 13 and 14 as usual, but rather are located within the spaces 22 and 23, as described, and join the bulldozer blade 41 materially inside the ends thereof.

It is often the case, however, that the bulldozer blade 41 does its severest work adjacent one end and sometimes nearly all of the load upon the blade is imposed at one end thereof. For that reason there are provided box-like braces 42 and 43 respectively, which extend from the side beams 27 and 28 forwardly and outwardly to the ends of the bulldozer blade 41, so that an exceedingly rigid construction is provided, readily able to transmit the forces involved. These braces outside the beams are considerably better than can ordinarily be provided, since they can start from a point on the beams 27 and 28 materially behind or to the rear of the front face of the radiator 11. If the braces were disposed ahead of the radiator 11 and between the beams 27 and 28, the braces would have to be far enough forward to clear the radiator 11 especially in uppermost position. Hence, by locating the braces 42 and 43 outwardly of the beams 27 and 28, substantially larger braces extending farther to the rear can be employed, thus materially improving the rigidity of the structure.

The braces serve as convenient mountings for adjustable ground-engaging shoes 45 which can be set at any desired position to limit the ground penetration of the tool or can be entirely removed if not wanted. The shoes are far enough apart to afford good lateral stability but are well protected by the braces against mechanical injury.

In order to raise and lower the bulldozer, substantially standard hydraulic mechanism is utilized and consequently is not described in detail except for its mounting.

On each side of the main frame 7 and preferably removably fastened to the frame members 8 and 9, are similar brackets 46 and 47 which are substantially planar plates extending downwardly below the frame members 8 and 9. The brackets extend upwardly above the top of the hood 12 and are tied together for transverse rigidity by a bolt 48 which tends to draw them together against an interposed spaced tube 40 through which the bolt 48 passes. The brackets 46 and 47 are located within the spaces 22 and 23 and preferably are interposed generally between the frame members 8 and 9 and the side beams 27 and 28. To avoid excessive strains upon the bearings 31 especially after the mechanism is old and worn, thrust rollers 50 journalled upon the U frame approximately in line with the diagonal boundary of the braces 42 and 43 are situated to run upon the planar surface of the brackets 46 and 47 which consequently act as vertical guides.

Adjacent its upper portion each of the brackets 46 and 47 is hooked toward the rear to provide a pivot boss 49 for the bifurcated end 51 of an associated hydraulic cylinder 52, which is secured in place by a pivot pin 53. The cylinder 52 is part of a hydraulically expansible chamber, the other portion of which is a piston (not shown) disposed within the cylinder and fastened to a piston rod 55 so that in effect a plunger is provided. The axis of each hydraulically expansible mechanism is substantially in the same plane as the center of the associated side beam 27 or 28 so that the expansible mechanism itself is substantially located in the adjacent one of the spaces 22 or 23.

The lower end of the plunger 53 is connected by a pivot pin 54 to an extension 56 secured to and upstanding from the adjacent side beam 27 or 28. Since the connection 54 through which the lifting and lowering forces are transmitted is considerably to the rear of the fastenings 60 which secure the brackets 46 and 47 to the frame members 8 and 9, I preferably provide a stabilizing extension 65 on each of the brackets 46 and 47 which is fastened to the adjacent frame member by bolts 70 located to the rear of the connection 54. In this way the stresses are divided on opposite sides of the line of force (the axis of the cylinder 52) and a secure mounting is provided.

The cylinders 52 on opposite sides of the machine are connected together with hydraulic hoses 61 and pipes 62 in a conventional manner and are under the control of a valve 64 operated by a handle 66 and supplied with pressure fluid through conduits 67 extending from a pump (not shown) which draws its fluid through an intake pipe 68 extending to a supply tank 69 supported at a convenient location on the main frame 7.

With this structure, by suitable operation of the handle 66, the tractor operator can extend or retract the expansible mechanisms 52 to raise and lower the side beams 27 and 28 with respect to the tractor main frame 7, thus raising and lowering the bulldozer blade 41.

I claim:

1. An implement for a tractor having a main frame and a pair of side frames connected thereto leaving lateral spaces therebetween comprising a push frame having side beams disposed in said spaces respectively, means for pivotally mounting said side beams upon said tractor, a tool mounted upon said push frame, brackets secured to said main frame and having portions disposed in said spaces respectively alongside said side beams, hydraulic cylinders pivoted respectively to said brackets directly above said spaces, plungers operating within said cylinders and pivoted directly to said beams, and means for concurrently actuating said plungers within said cylinders.

2. In a tractor having a main frame and a pair of side frames connected in spaced relation thereto and defining therewith a lateral space on either side of said main frame: a push frame having side beams accommodated within said lateral spaces and pivoted to said tractor; a tool mounted upon said push frame; brackets secured to either side of said main frame with portions thereof overlying said lateral spaces; means extending across said main frame for fastening said brackets together; and hydraulic actuators overlying each of said lateral spaces and operatively connected to and between said side beams and said overlying bracket portions for swinging said push frame about its pivotal points.

3. In a tractor having a main frame and a pair of side frames connected in spaced relation thereto and defining therewith a lateral space on either side of said main frame: a push frame having side beams accommodated within said lateral spaces and pivoted to said tractor; a tool mounted upon said push frame; brackets secured to either side of said main frame with portions thereof overlying said lateral spaces; and a hydraulic actuator pivoted to each of said side beams and to said bracket portions for elevating and lowering said push frame.

4. In a tractor having a main frame and a pair of side frames connected in spaced relation thereto and defining therewith a lateral space on either side of said main frame: a push frame having side beams accommodated within said lateral spaces and pivoted to said tractor; upstanding brackets supported by said main frame on either side thereof and having portions overlying said lateral spaces; and a hydraulic actuator pivoted to and between each of said side beams and bracket portions for elevating and lowering said push frame.

5. In a tractor having a main frame and a pair of side frames connected in spaced relation thereto and defining therewith a lateral space on either side of said main frame: a push frame having side beams accommodated within said lateral spaces and pivoted to said tractor for swinging movement; an upstanding extension carried by each of said side beams intermediate its ends; an upstanding bracket supported by said main frame on either side thereof and having a portion overlying one of said lateral spaces; and a hydraulic actuator pivoted to and between each of said upstanding extensions and said overlying bracket portion.

ELLSWORTH W. AUSTIN.